United States Patent
Freeman et al.

(10) Patent No.: US 9,556,750 B2
(45) Date of Patent: Jan. 31, 2017

(54) COMPARTMENTALIZATION OF COOLING AIR FLOW IN A STRUCTURE COMPRISING A CMC COMPONENT

(71) Applicant: Rolls-Royce North American Technologies, Inc., Indianapolis, IN (US)

(72) Inventors: Ted J. Freeman, Danville, IN (US); David J. Thomas, Brownsburg, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 719 days.

(21) Appl. No.: 14/142,417

(22) Filed: Dec. 27, 2013

(65) Prior Publication Data

US 2015/0016971 A1 Jan. 15, 2015

Related U.S. Application Data

(60) Provisional application No. 61/772,466, filed on Mar. 4, 2013.

(51) Int. Cl.
| | |
|---|---|
| *F01D 25/14* | (2006.01) |
| *F01D 5/14* | (2006.01) |
| *F01D 5/18* | (2006.01) |
| *F01D 5/28* | (2006.01) |
| *F01D 11/00* | (2006.01) |
| *F23R 3/00* | (2006.01) |

(52) U.S. Cl.
CPC ............ *F01D 25/14* (2013.01); *F01D 5/147* (2013.01); *F01D 5/189* (2013.01); *F01D 5/282* (2013.01); *F01D 5/284* (2013.01); *F01D 11/005* (2013.01); *F23R 3/002* (2013.01); *F05D 2260/201* (2013.01); *F05D 2300/6033* (2013.01); *Y02T 50/672* (2013.01); *Y02T 50/676* (2013.01)

(58) Field of Classification Search
CPC ............ F01D 5/189; F01D 5/284; F01D 5/00; F01D 5/12; F01D 5/18; F01D 5/187; F01D 5/188; F01D 25/284; F01D 25/08; F01D 25/12; F01D 25/14; F01D 25/145
USPC ...................................................... 416/96 A
See application file for complete search history.

(56) References Cited

U.S. PATENT DOCUMENTS

| | | | |
|---|---|---|---|
| 5,630,700 A * | 5/1997 | Olsen ...................... | F01D 5/189 415/134 |
| 6,039,325 A | 3/2000 | Steinetz et al. | |
| (Continued) | | | |

FOREIGN PATENT DOCUMENTS

| | | |
|---|---|---|
| DE | 3512008 A1 | 10/1986 |
| EP | 1087103 A2 | 3/2001 |
| (Continued) | | |

OTHER PUBLICATIONS

International search report PCT/US2013/077938 mailed on Jan. 12, 2015.

*Primary Examiner* — Richard Edgar
(74) *Attorney, Agent, or Firm* — Fishman Stewart PLLC

(57) ABSTRACT

A structure in a gas turbine engine comprises a spar and a CMC component adjoining the spar and separated from the spar by a cavity supplied by cooling air. At least one rope seal is installed in the cavity within a groove made in the spar to thus compartmentalize the cavity and control the flow of cooling air.

20 Claims, 3 Drawing Sheets

(56) References Cited

U.S. PATENT DOCUMENTS

| | | | |
|---|---|---|---|
| 6,200,092 B1 | 3/2001 | Koschier | |
| 6,464,456 B2 * | 10/2002 | Darolia | F01D 9/042 |
| | | | 415/134 |
| 7,247,003 B2 | 7/2007 | Burke et al. | |
| 7,452,182 B2 | 11/2008 | Vance et al. | |
| 7,452,189 B2 * | 11/2008 | Shi | F01D 5/147 |
| | | | 415/200 |
| 7,641,440 B2 | 1/2010 | Morrison et al. | |
| 7,670,116 B1 | 3/2010 | Wilson, Jr. et al. | |
| 7,758,314 B2 | 7/2010 | Wilson et al. | |
| 8,015,705 B2 | 9/2011 | Wilson, Jr. et al. | |
| 8,142,163 B1 | 3/2012 | Davies | |
| 2006/0228211 A1 | 10/2006 | Vance et al. | |
| 2009/0193657 A1 | 8/2009 | Wilson, Jr. et al. | |
| 2011/0305580 A1 | 12/2011 | Wilson, Jr. et al. | |
| 2013/0152591 A1 * | 6/2013 | Dery | F23R 3/007 |
| | | | 60/753 |

FOREIGN PATENT DOCUMENTS

| | | |
|---|---|---|
| EP | 1852572 A2 | 11/2007 |
| EP | 2011777 A2 | 1/2009 |
| EP | 2204537 A2 | 7/2010 |
| EP | 2322762 A1 | 5/2011 |

* cited by examiner

COMPARTMENTALIZATION OF COOLING AIR FLOW IN A STRUCTURE COMPRISING A CMC COMPONENT

FIELD OF TECHNOLOGY

This application claims priority to U.S. Provisional Patent Application No. 61/772,466, filed Mar. 4, 2013, the contents of which are hereby incorporated in their entirety.

This disclosure relates to gas turbine engines, more particularly to high temperature turbine components such as vanes and blade tracks, and even more particularly to isolating segments in airfoils using ceramic matrix composite (CMC).

BACKGROUND

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However, as turbine entry temperatures increase, the life of an un-cooled turbine falls, necessitating the development of better materials and the introduction of internal air cooling.

In modern engines, the high-pressure turbine gas temperatures are hotter than the melting point of the material of the blades and vanes, necessitating internal air cooling of these airfoil components. During its passage through the engine, the mean temperature of the gas stream decreases as power is extracted. The need to cool the static and rotary parts of the engine structure decreases as the gas moves from the high-pressure stage(s), through the intermediate-pressure and low-pressure stages, and towards the exit nozzle. The high-pressure turbine components are cooled by using high pressure air from the compressor that has by-passed the combustor and is therefore relatively cool compared to the gas temperature. Typical cooling air temperatures are between 800° and 1000° K., while gas temperatures can be in excess of 2100° K. The cooling air from the compressor that is used to cool the hot turbine components is not used fully to extract work from the turbine. Therefore, as extracting coolant flow has an adverse effect on the engine operating efficiency, it is important to use the cooling air effectively.

Existing turbine components such as vanes and blade tracks utilize single-wall cooling configurations. The need exists in a structure that has the potential to optimize cooling flow. This can be achieved by controlling the flow of air via an improved component through compartmentalizing sections of the airflow while distributing CMC airfoil load across multiple locations.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 3a is an enlarged perspective view of an airfoil assembly, taken from the perspective of arrows 3a-3a of FIG. 2a;

Figure 1:
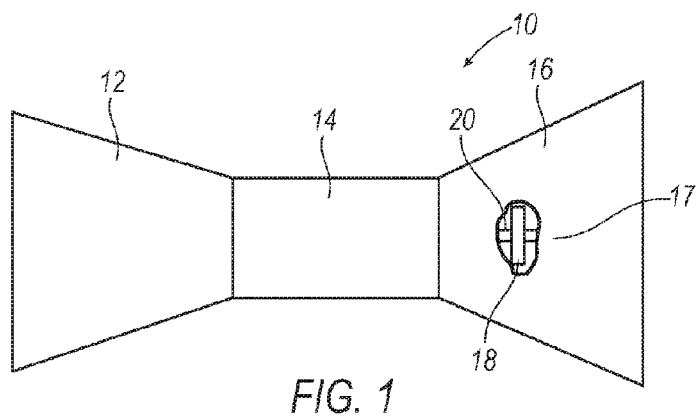
FIG. 1 is a schematic representation of a gas turbine engine.

For the purposes of promoting an understanding of the principles of the disclosure, reference will now be made to the embodiment illustrated in the drawings, and specific language will be used to describe the same. It will nevertheless be understood that no limitation of the scope of the disclosure is thereby intended, such alterations and further modifications in the illustrated device, and such further applications of the principles of the disclosure illustrated therein being contemplated as would normally occur to one skilled in the art to which the disclosure relates. When used in this specification and claims, the terms "comprises" and "comprising" and variations thereof mean that the specified features, steps or integers are included. The terms are not to be interpreted to exclude the presence of other features, steps or components.

DETAILED DESCRIPTION

The present disclosure is contemplated as being applicable with virtually all types and configurations of gas turbine engines. The gas turbine engines contemplated herein are applicable for use in aircraft, as industrial power plants, and as propulsion systems in vehicles and vessels. Industrial power plant applications include, for example, pumping sets for gas and oil transmission lines and electricity generation systems. The term "aircraft" is generic and includes helicopters, airplanes, missiles, unmanned space devices, trans-atmospheric vehicles and other substantially similar devices. The term "airfoil" may be utilized herein to refer to vanes, static airfoils within the turbine, unless specifically provided to the contrary.

An exemplary method and structure is provided that includes a compartmentalization feature which can be achieved by placing a rope seal between two adjoining components, one of them being a CMC structure. The rope seal could be compressed between the components. The compression can be achieved by providing grooves for the rope. The grooves can be arranged within a raised landing. The rope seal can be used in a single row or multiple rows.

Referring now to FIG. 1, there is illustrated a schematic representation of a gas turbine engine 10. This non limiting depiction of gas turbine engine 10 comprises a compressor section 12, a combustor section 14, and a turbine section 16, which can comprise high-pressure, intermediate-pressure and low-pressure stages (not shown). A person of ordinary skill in the art should appreciate that there are a multitude of ways in which the gas turbine engine components may be linked together. For instance, the engine may include a fan stage, a nozzle and/or additional compressors, and turbine stages may be added with intercoolers connecting the compressor stages. It is in this section 16 that the improved airfoil structure of the present disclosure, conditionally shown by reference number 17, can be located.

The turbine section 16 comprises at least one rotor 18 having a plurality of turbine blades coupled thereto. A rotatable shaft 20 is located within a mechanical housing/case of the turbine section 16 and is coupled to the rotor 18. The rotor 18 and the shaft 20 may also be integrated together into a unitary component. The rotatable shaft 20 and the rotor 18 are supported by a plurality of bearings (not shown). As the hot exhaust gas passes from the combustor section 14, the plurality of turbine blades rotate as the gas expands and functions to extract work from the hot exhaust flow. While the present disclosure will be discussed with reference to stationary turbine components such as vane (nozzle guide vane) spars or blade tracks defining the outer flow path above rotating blades, it is contemplated that forms of the present disclosure can be applicable to other gas turbine engine components including, but not limited to, elements of the combustor section 14 such as a combustor liner.

Figure 2A:
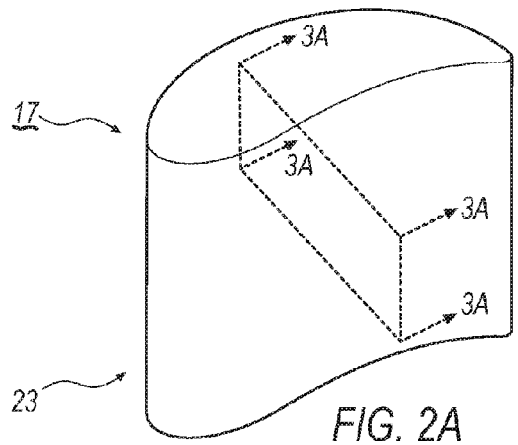
FIGS. 2a and 2b are perspective views illustrating an example of an airfoil assembly in which the present disclosure is realized.
Figure 2B:
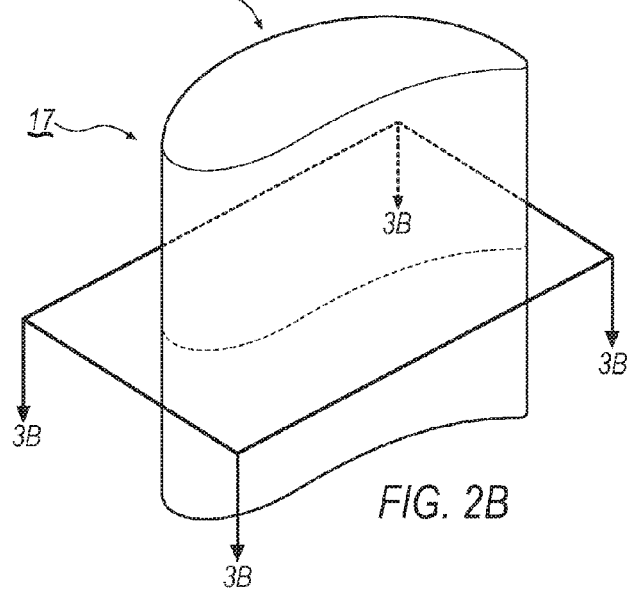
Figure 3A:
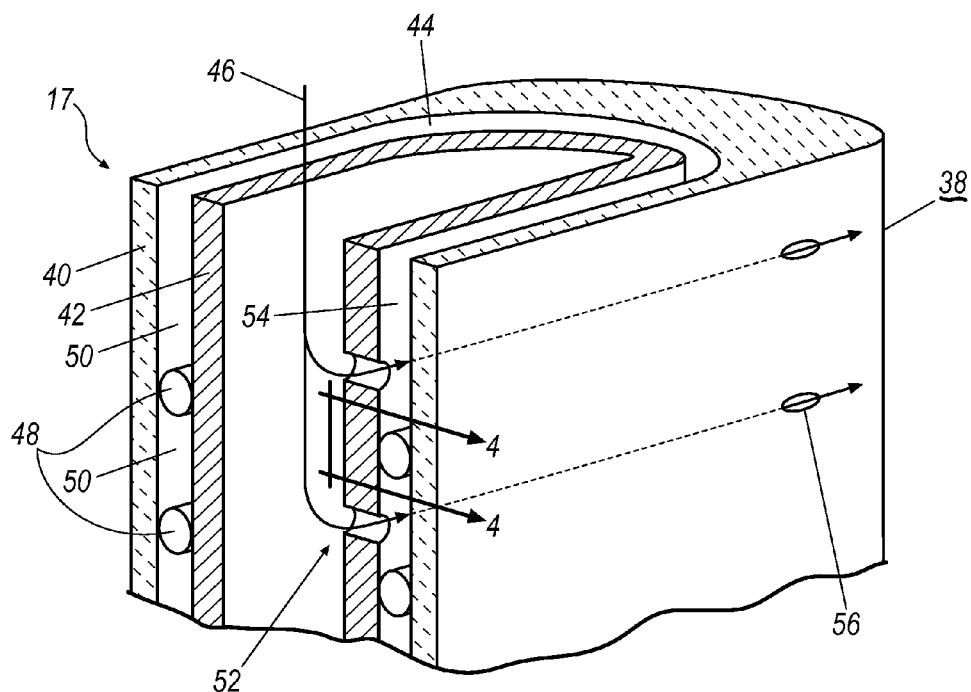
Figure 3B:
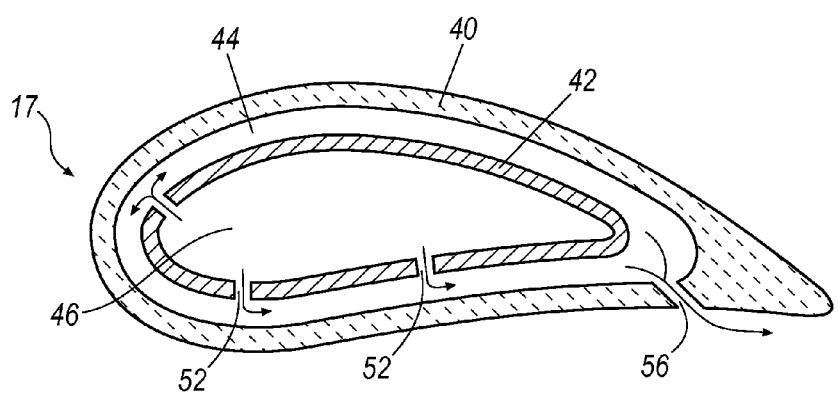
FIG. 3b is an enlarged side sectional view taken from the perspective of arrows 3b-3b of FIG. 2b.

The compartmentalization according to an exemplary embodiment is accomplished in a gas turbine engine assembly. Shown in FIGS. 2a and 2b is an airfoil 23, an example of where the technical solution of the present disclosure can be realized. The airfoil 23 is used in connection with a static vane for a gas turbine. Cross-section along lines 3a-3a in FIG. 2a is shown in FIG. 3a, and cross-section along lines 3b-3b in FIG. 2a is shown in FIG. 3b. Further on, cross-section made along lines 4-4 of FIG. 3a is presented in FIG. 4 serving for the illustration of the principle of the technical solution according to the present disclosure.

Figure 4:
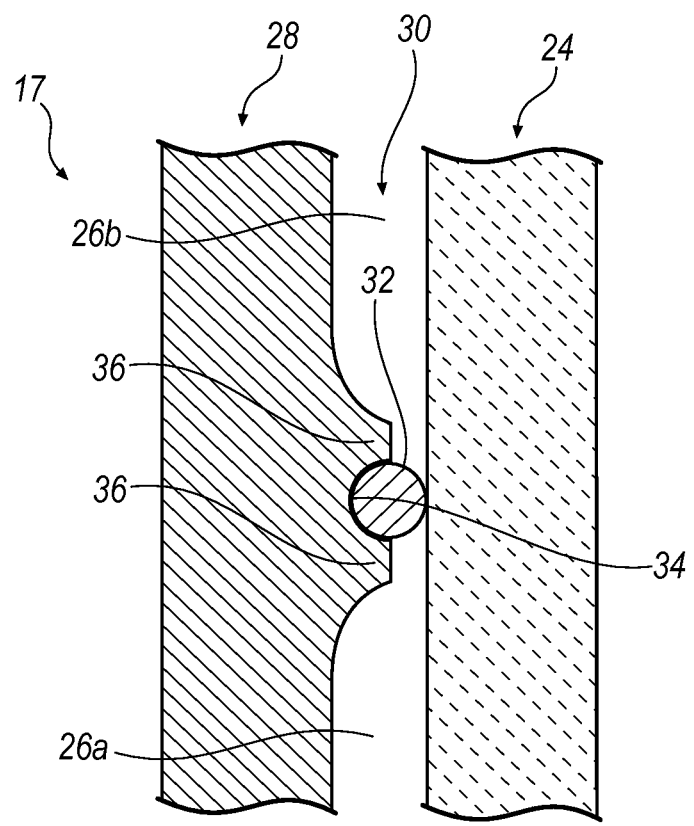
FIG. 4 is an enlarged side sectional view taken from the perspective of arrows 4-4 of 3a, showing the principle of compartmentalization in a gas turbine engine structure in accordance with the present disclosure.

Shown in FIG. 4 is a CMC component 24 and a metallic spar 28 adjoining each other. The spar 28 and the CMC component 24 are spaced apart and separated by a cavity 30 where cooling air finds itself. A continuous circular-shaped rope seal 32 is disposed between the spar 28 and the CMC component 24, and this structure or assembly serves as a means of compartmentalizing cooling air into sections 26a and 26b between the CMC component 24 and metallic spar 28. The sections 26a and 26b are separated by the seal 32, and one section contains air of a temperature cooler than the other section. To accommodate the seal 32, a groove 34 is formed between a pair of spaced apart raised landings 36 on the spar 28. The groove 34 is moon-shaped, but it will be appreciated that the groove 34 may take on other geometric configurations.

The structure shown gives rise to the purposeful compartmentalization of flow in a cooled CMC component to direct air to areas in which it is desired and to discourage air from flowing to areas where it is not wanted. The control of the amount of flow and back pressure generation is arrived at as well. Various types of rope seals, in single or multiple rows, and compressing them between a CMC component and a metallic component can be utilized for the compartmentalization. It can be metal sheathed, woven, braided, but the unconditional parameter the rope seal must possess is its thermal endurance. Thus, the material for the rope seal for the present application includes thermo stable material, such as, but is not limited to, aluminosilicate or aluminum oxide.

With reference to FIGS. 3a and 3b, in which a fragment of an airfoil 38 is presented, the airfoil comprises an exterior CMC vane 40 and an interior metal spar 42. The spar 42 is enclosed by the CMC vane 40, with a cavity 44 contained between them. There is a cooling air passage 46 inside the walls of the metal spar 42. Rope seals 48 compartmentalize the cavity 44 into sections 50. Cooling air supplied via the cooling air passage 46 finds its way into the compartmentalized cavity 44 through impingement holes 52 for each section made in the spar wall 54. Made in each section exit holes 56 in the CMC vane 40 are used for removing the air from the sections 50.

The rope seals 48 should be capable of withstand during the service temperature required by the design. Methods used for compressing the rope seals include, but are not limited to, conventional rope style grooves and grooves formed within raised landings.

Compartmentalization of flow in CMC component 17 is necessary due to the relatively low through thickness strength of the material. By controlling the distribution and flow rate of cooling air within a component, the impingement and convective components, heat transfer can be adjusted to minimize the build-up of high thermal stresses within the CMC component. In addition, depending upon the application, the compartmentalization of the seals 48 can act as load transfer mechanisms or compliant layers to minimize or eliminate point loading between the CMC component and the mating metal component.

In addition, the compartmentalization could be used to control pressure within the vane by placing the seals in such a way so as to reduce the pressure between the metal component and the CMC locally.

One of the many possible methods of compartmentalization has been designed. For vanes, a method using raised ribs that are grooved to accept rope seals was designed and run.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that various modifications and changes can be made to these embodiments without departing from the scope of the present disclosure as set forth in the claims. The specification and the drawings are to be regarded as an illustrative thought instead of merely restrictive thought.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the concept in diverse forms thereof.

While the disclosure has been presented in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

What is claimed is:
1. A gas turbine engine structure comprising:
   a static metal component;
   a CMC component spaced apart from the static metal component and separated therefrom by a cavity having sections with respective passages for receiving cooling air into the cavity through the static metal component and removing cooling air from the cavity through the CMC component; and
   at least one rope seal located between the static metal component and the CMC component, the rope seal dividing the cavity into the sections to thereby compartmentalize the cavity and cooling air flow is ensured.

2. The structure as claimed in claim 1, wherein the at least one rope seal is pressed into a moon-shaped groove formed in the static metal component.

3. The structure as claimed in claim 1, wherein the at least one rope seal is pressed into a groove formed between two raised landings with curved sidewalls extending from the static metal component.

4. The structure as claimed in claim 1, wherein the seal is made with a single rope.

5. The structure as claimed in claim 1, wherein the seal is made with multiple ropes dividing the cavity into a plurality of sections.

6. The structure as claimed in claim 1, wherein the rope seal is made of a thermo stable material that includes at least one of aluminosilicate or aluminum oxide.

7. The structure as claimed in claim 1, wherein the static metal component includes a vane spar.

8. The structure as claimed in claim 1, wherein the static metal component includes a flow path wall above rotating blades.

9. The structure as claimed in claim 1, wherein the static metal component includes a combustor liner.

10. A method of compartmentalizing cooling airflow in a gas turbine engine structure, the method comprising the steps of:
providing a static metal component including a spar;
providing a CMC component adjoining the spar and separated therefrom by a cavity carrying the cooling airflow; and
dividing the cavity into at least two sections by installing a rope seal between the spar and CMC component, to thereby control the flow of the cooling air in the sections of the cavity along respective passages that receive the cooling airflow into the cavity through the static metal component and remove the cooling airflow from the cavity through the CMC component.

11. The method as claimed in claim 10, wherein dividing the cavity into at least two sections includes dividing the cavity into a plurality of sections by installing multiple rope seals.

12. The method as claimed in claim 10, wherein the at least one impingement hole is formed in each section of the spar to receive cooling air into the section; and
wherein the at least one exit hole is formed in each section of the CMC component to remove cooling air and thereby control the flow of the cooling air in the structure.

13. The method as claimed in claim 10, wherein the rope seal is made of thermo stable material that includes at least one of aluminosilicate or aluminum oxide.

14. A method of manufacturing a gas turbine engine structure, the method comprising the steps of:
providing a static metal component including a spar;
providing a CMC component adjacent to the spar and separated therefrom by a cavity;
installing at least one rope seal between the spar and CMC component, to thereby compartmentalize the cavity into sections;
forming at least one impingement hole in each section of the spar to receive cooling air along respective passages of the sections; and
forming at least one hole in each section of the CMC component to remove cooling air from the cavity and thereby control the flow of the cooling air in the structure.

15. The method as claimed in claim 14, wherein installing at least one rope seal includes installing multiple rope seals to thereby divide the cavity into a plurality of sections.

16. The method as claimed in claim 14, further comprising forming a moon-shaped groove in the spar to accommodate the at least one rope seal.

17. The method as claimed in claim 14, further comprising forming raised landings with curved sidewalls extending from the spar to form a groove to accommodate the at least one rope seal.

18. The method as claimed in claim 14, wherein the rope seal is made of thermo stable material that includes at least one of aluminosilicate or aluminum oxide.

19. The method as claimed in claim 18, wherein the thermo stable material further includes aluminosilicate.

20. The method as claimed in claim 18, wherein the thermo stable material further includes aluminum oxide.

* * * * *